United States Patent
Damitz et al.

(10) Patent No.: US 7,383,116 B2
(45) Date of Patent: Jun. 3, 2008

(54) METHOD AND DEVICE FOR CONTROLLING AN INTERNAL COMBUSTION ENGINE

(75) Inventors: Jens Damitz, Illingen (DE); Michael Kessler, Weissach (DE); Mohamed Youssef, Nuefringen (DE); Arnold Engber, Steinheim an der Murr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/584,717

(22) Filed: Oct. 19, 2006

(65) Prior Publication Data

US 2007/0106450 A1    May 10, 2007

(30) Foreign Application Priority Data

Oct. 24, 2005  (DE) ............... 10 2005 050 792
Jan. 11, 2006  (DE) ............... 10 2006 001 369

(51) Int. Cl.
  *G06F 17/00*  (2006.01)
  *G05D 1/00*  (2006.01)

(52) U.S. Cl. ............... 701/102; 701/103; 123/673
(58) Field of Classification Search ........ 701/101–105, 701/111, 114, 115; 123/406.2, 435, 406.21, 123/406.22; 73/35.01–35.06, 35.09, 35.12, 73/118.2
See application file for complete search history.

(56) References Cited

U.S. PATENT DOCUMENTS 6,675,787 B2 * 1/2004 Damitz et al. ............... 123/673
7,231,289 B2 * 6/2007 Damitz et al. ............... 701/104

FOREIGN PATENT DOCUMENTS

DE      103 05 656      1/2004

* cited by examiner

*Primary Examiner*—Willis R. Wolfe, Jr.
*Assistant Examiner*—Johnny H. Hoang
(74) *Attorney, Agent, or Firm*—Kenyon & Kenyon LLP

(57) ABSTRACT

A method and a device for controlling an internal combustion engine, in which a noise variable is compared to a setpoint value, and an actuating variable is specified based on the comparison. The noise variable is computed using a weighted summation of at least two characteristics.

5 Claims, 2 Drawing Sheets

METHOD AND DEVICE FOR CONTROLLING AN INTERNAL COMBUSTION ENGINE

BACKGROUND INFORMATION

A method and a device for controlling an internal combustion engine are described in German Patent No. DE 103 05 656. In the method described there, various characteristics variables are ascertained starting from the signal of a structure-borne vibration sensor, which are used for the regulation of the internal combustion engine.

SUMMARY OF THE INVENTION

In the control and/or regulation of an internal combustion engine, especially a Diesel internal combustion engine, partially homogeneous and/or homogeneous combustion methods are used, which are characterized by a high exhaust gas recirculation rate in combination with an injection modified in comparison to conventional combustion for the achievement of a large ignition delay. These combustion methods are used in partial areas of the engine's operating characteristics map as an operating type besides the conventional, inhomogeneous combustion method. In these partially homogeneous or homogeneous combustion methods it is of advantage that low emissions, especially of nitrogen oxides or particulates, take place. A disadvantage in these partially homogeneous and homogeneous combustion methods is that, based on the high ignition delay, noise emissions appear in a reinforced manner, which cannot be completely avoided by known measures, such as an increased exhaust gas recirculation rate or an ignition retard of the combustion. These noise emissions occur, above all, during the transition from conventional operation to partially homogeneous operation, as well as in dynamic operating states.

Now, according to the present invention, it is provided that a characteristics variable is made available which makes possible an accurate regulation and/or control of the internal combustion engine, by ascertaining a noise variable that characterizes the intensity of the combustion noises. It has turned out to be particularly advantageous that this characteristics variable is computed from at least two individual noise variables, using a weighted summation.

This noise variable makes possible a valuation of the noise emission in the vehicle. Because of this, it is possible to optimize permanently the control and/or the regulation of the internal combustion engine, taking into consideration the combustion noises.

The individual noise variables are preferably ascertained starting from measured variables that characterize the combustion procedure. Signals such as of the combustion chamber pressure and/or the structure-borne noise should be regarded as being most suitable. Besides the individual noise variables derived from these variables, additional individual noise variables starting from the air system may be computed.

The factors used for the weighting of the individual noise variables are learned.

DETAILED DESCRIPTION

Figure 1:
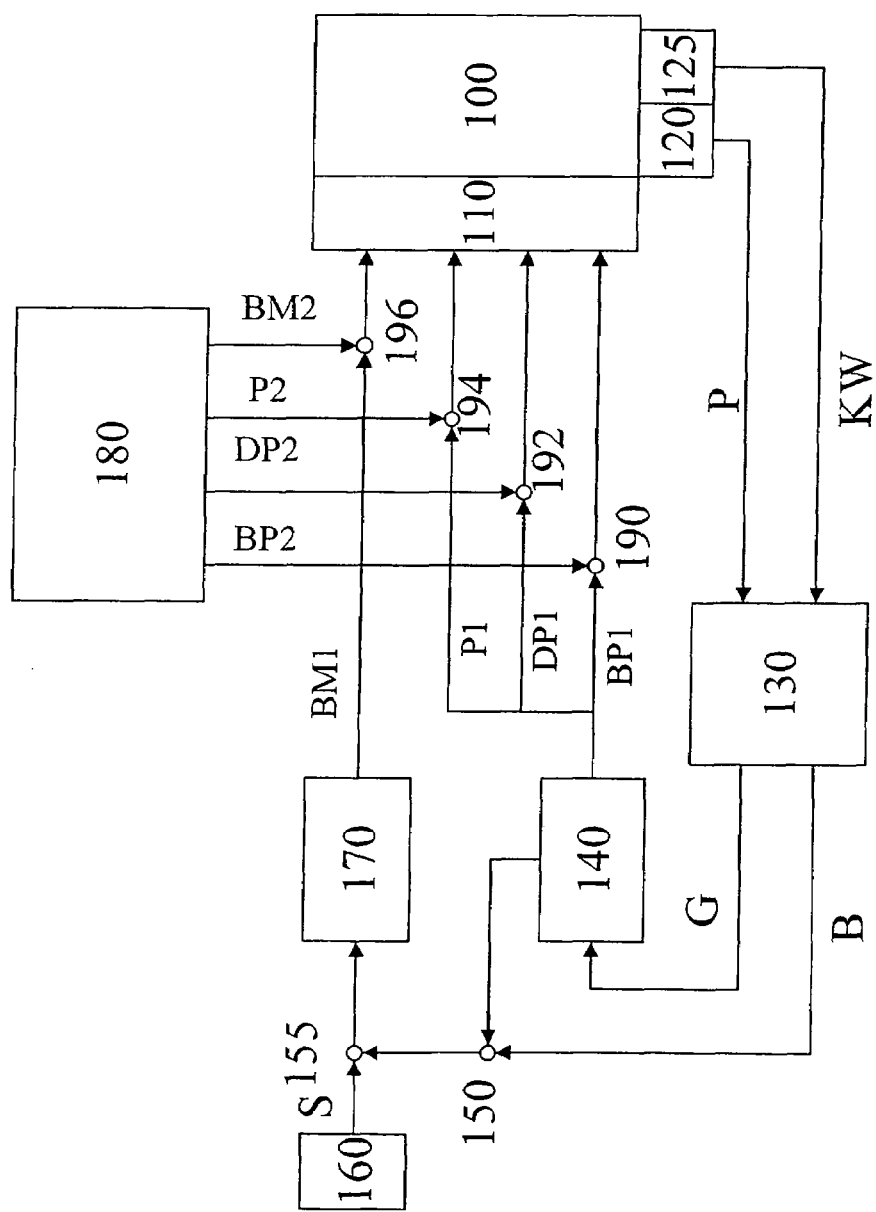
FIG. 1 shows the important elements of the device according to the present invention.

The procedure according to the present invention is represented in FIG. 1 with the aid of a block diagram. An internal combustion engine is designated by 100. Assigned to this is an injection system 110, a first sensor 120 and a second sensor 125. Besides these elements, additional sensors and additional actuators may also be assigned to internal combustion engine 100.

The first sensor supplies a signal P and a criterion computation 130, and second sensor 125 supplies a signal KW to criterion computation 130.

Starting from these and possibly additional variables, criterion computation 130 computes a first variable B and a second variable G. Second variable G, which is also designated as a noise variable, arrives at a second controller 140, which is also designated as a noise controller, and from there to a node 150. First variable B arrives directly at node 150. A node 155 has applied to it the output signal of node 150, and at its second input there is present output signal S of a setpoint specification 160. The output signal of node 155 is applied to a first controller 170.

Furthermore, additional control functions 180 are provided, which make available various control variables. Among others, this is a variable BP2 which indicates the beginning of a preinjection, a variable DP2 which indicates the duration of a preinjection, the variable P2 which indicates the rail pressure of a common rail system and a variable BM2 which indicates the beginning of a main injection. These variables respectively reach a node 190, 192, 194 and 196.

Output signal BP1 of second controller 140 is present at the second input of node 190. Output signal DP1 of second controller 140 is present at the second input of node 192. Output signal P1 of second controller 140 is present at the second input of node 194. Output signal BM1 of first controller 170 is present at the second input of node 196. That is, onto the corresponding actuating variables of control functions 180 are superposed in nodes 190, 192, 194 and 196 the actuating variables of first controller 170 and second controller 140 respectively. And they are used for controlling injection system 110.

Normally, as the injection system, injectors are used that include a magnetic valve or a piezo actuator, whose control beginning influences the beginning of the respective injection and whose control end influences, together with the control beginning, the control duration, and therewith the injected fuel quantity. Furthermore, an actuating element is provided that influences the rail pressure. As a function of signals BP1, DP1, P1 and BM1, the magnetic valve or the piezo actuator sets the respective variables. The named variables give a preferred selection of variables with which noise controller 140 and first controller 170 engage (intervene). Besides these variables, the two controllers are able to engage with additional variables. In response to simplified specified embodiments, it may also be provided that the controllers engage with only one selection of variables or even with individual variables.

Further actuating variables which the noise controller is able to engage with are the duration of preinjection, the beginning of the preinjection and/or the number of preinjections. That is, one or more preinjections may be provided, in the case of one or more of these preinjections the duration and/or the beginning of the preinjection being engaged. If appropriate actuators are present, in an advantageous manner the swirl of the air quantity that is supplied to the internal combustion engine may also be used as an actuating variable. Moreover, a heating element may also be engaged. This means that, for noise regulation, a special glow procedure, which is also designated as intermediate glowing of the glow plugs is initiated. In this context, the temperature of the glow plugs, the duration of the glowing procedure, the frequency of the glowing procedure and/or another variable that has an effect upon the temperature of the glow plug are able to be used as an actuating variable. Furthermore, it may be provided that the noise controller engages with the air system. It is particularly advantageous if the exhaust gas recirculation rate or a variable comparable to the exhaust gas recirculation rate is used.

Now, according to the present invention, it is provided that setpoint specification 160 specifies a setpoint value S for the combustion state. At node 155 this is compared to first variable B. Starting from this comparison, first controller 170 determines an actuating variable BM1, which influences the beginning of the main injection. This variable is linked at node 196 to control variable BM2, which also indicates the beginning of combustion, and is specified by additional control functions 180. That is, criterion computation 130 computes, starting from signal P, an actual value of the combustion state which is linked in node 155 to setpoint value S. Starting from the deviation of the actual value of the setpoint value for the combustion state, first controller 170 determines actuating variable BM1 for influencing the beginning of the main injection. That is, the beginning of the main injection is regulated as a function of the deviation of the combustion state from its setpoint value.

In addition, criterion computation 130 computes a second variable G, which characterizes the intensity of the combustion noises. The computation of this noise variable is shown in greater detail in FIG. 2. This noise variable G is supplied to a second controller, which will also be designated as noise controller 140 below. The actual value of noise variable G is then adjusted by noise controller 140 to a maximum tolerable value, which is also designated as a setpoint value. In order to adjust the noise emission, the second controller engages with duration of preinjection DP1, the beginning of preinjection BP1 and/or rail pressure P1. Thus, for example, a correcting value for the corresponding variables is specified by the controller, using which the corresponding variables BP2, DP2 and P2, which are specified by standard control functions 160, are appropriately corrected in nodes 190, 192 and/or 194. The injection system is then appropriately controlled, using the output signals of the corresponding nodes.

Starting from signal P of the first sensor, according to the present invention, both a noise variable ZG and a variable B, which characterizes the combustion state, are computed. These variables are supplied to a controller 170 or 140, respectively, which adjusts these variables to a specified setpoint value. In this context, it is especially provided that setpoint value S for the combustion state is able to be specified as a function of the operating state of the internal combustion engine. A fixed value is preferably specified for the setpoint value of controller 140.

Noise controller 140 is able to engage with all three of the variables mentioned or with only one or two of these variables. It is especially advantageous if the noise controller engages with even further variables, that are not shown, which have an influence on the noise emission of the vehicle.

In addition, in one especially advantageous embodiment it may be provided that noise controller 140 engages additionally, via node 150, with the actual value of the combustion state, within the meaning of a disturbance-variable compensation. These four engagements shown are able to take place individually or in combination with one another.

This means that second controller 140, which controls the noise variable, engages with the beginning of a preinjection, the duration of a main injection, the duration of a preinjection, the fuel pressure and/or the combustion state. The first controller preferably engages only with the beginning of the main injection.

Figure 2:
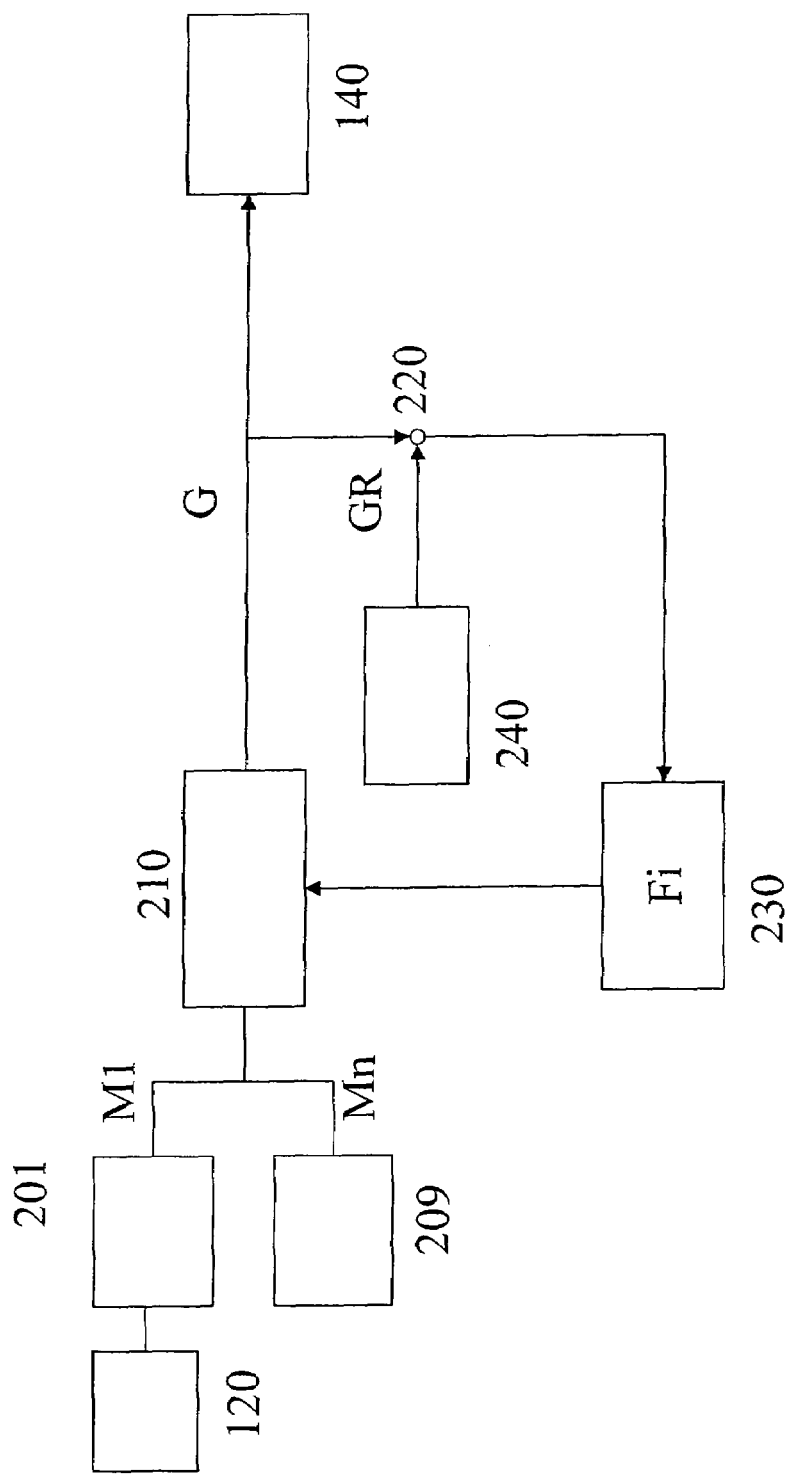
FIG. 2 shows a detailed illustration of the signal propagation according to the present invention.

FIG. 2 shows the determination of noise variable G in detail. Elements that have already been described in FIG. 1 are denoted by matching reference symbols. A first criterion specification 201 makes available a first criterion M1. A second criterion specification is designated as 209, and it makes available a second criterion Mn. The criterion specifications apply criteria M1, Mn to a summation 210. Output signal G, which is equivalent to the noise variable, reaches noise controller 140 and node 150. Furthermore, noise variable G reaches a factor specification 230 via a node 220. At the second input of node 220 output signal GR of a reference value specification 240 is present.

Starting from the signal of first sensor 120, criterion specification 201 computes a first criterion M1. For this purpose, for example, the output signal of combustion chamber compression sensor 120 is specially filtered and processed until a criterion M1 is available which characterizes the noise emission of the engine. It is provided according to the present invention that at least two criterion specifications are provided, which determine at least two criteria. Thus, the second criterion can be formed using the same sensor signal and using a different filtering. It can also be provided that another sensor signal and/or another filtering be used. In particular, a structure-borne noise sensor can be used. Furthermore, a criterion is able to be ascertained starting from the air system.

As a noise-relevant criterion Mi from the air system, the boost pressure and/or the exhaust gas recirculation rate may be used. In this context, in the case of the regulation of the exhaust gas recirculation rate, the actual value of the exhaust gas recirculation rate and/or the system deviation and/or the actuating variable and/or a variable that characterizes these variables may be used as criterion Mi. Alternatively or in addition, the combustion chamber pressure at the beginning of the compression or a criterion which reflects the cylinder load may be used. It is especially advantageous if this is computed from the cylinder pressure using a regression.

The summation computes noise variable G starting from criteria Mi and weighting factors Fi. This is accomplished, for example, using the following formula:

$$G = \sum_{i=1}^{N} Fi * Mi$$

In this context, Mi designates the ith criterion and Fi designates the ith weighting factor. In this context, the number N assumes at least the value 2. That is, at least two criteria are used to compute the noise variable. However, it is also possible that more than two criteria are used.

In an especially advantageous specific embodiment it is provided that the weighting factors are learned. To do this, noise variable G is compared in node 220 to a reference value GR for the noise variable. Depending on this comparison, factors Fi are changed and suitably stored. For this, reference value specification 240 specifies a reference value GR.

The learning of the weighting factor preferably takes place within the scope of the invention. On a test stand, there is usually a criterion available which is normally used as a standard for the noise valuation. This is used as reference value GR. In the operating points to be applied, weighting factors Fi are set via an optimization algorithm in such a way that the error between reference criterion GR and noise variable G becomes a minimum. The factors Fi thus learned are stored in characteristics maps, and are able to be used in operation to compute the noise variable.

In one specific embodiment it may also be provided that, under suitable operating conditions, factors Fi are learned by comparison of noise variable G to a specified value GR.

In one especially advantageous specific embodiment it is provided that the filtering of a noise variable be provided which is adapted to the dynamic response of the human ear. That is, the noise variable corresponds to the auditory impression of a human being. Signal components that are perceived as disturbing are amplified more strongly than signal components that are not perceived as disturbing. For this purpose, the noise variable is filtered before being passed on to noise controller 140, individually for each cylinder, but in an identical manner. In the simplest embodiment, which achieves a corresponding effect, it is provided that a formation of an average value take place over a number of working cycles that is a function of the rotary speed of the engine.

What is claimed is:

1. A method for controlling an internal combustion engine, comprising:
    computing a noise variable using a weighted summation of at least two characteristics;
    comparing the noise variable to a setpoint value; and
    specifying an actuating variable based on the comparison.

2. The method according to claim 1, further comprising ascertaining at least one of the at least two characteristics starting from at least one of a combustion chamber pressure signal and a structure-borne noise signal.

3. The method according to claim 1, further comprising ascertaining at least one of the at least two characteristics starting from a signal of an air system.

4. The method according to claim 1, wherein a weighting factors used for a weighting of the characteristics are learned.

5. A device for controlling an internal combustion engine, comprising:
    means for computing a noise variable using a weighted summation of at least two characteristics;
    means for comparing the noise variable to a setpoint value; and
    means for specifying an actuating variable based on the comparison.

* * * * *